Jan. 18, 1938. A. W. HERRINGTON 2,105,918
4-WHEEL DRIVE VEHICLE
Filed Dec. 5, 1936 2 Sheets-Sheet 1

INVENTOR.
Arthur N. Herrington,
BY
Hood & Hahn.
ATTORNEYS.

Jan. 18, 1938.　　A. W. HERRINGTON　　2,105,918
4-WHEEL DRIVE VEHICLE
Filed Dec. 5, 1936　　2 Sheets-Sheet 2

INVENTOR.
Arthur K. Herrington,
BY
Hood + Hahn.
ATTORNEYS.

Patented Jan. 18, 1938

2,105,918

UNITED STATES PATENT OFFICE 2,105,918

4-WHEEL DRIVE VEHICLE

Arthur W. Herrington, Indianapolis, Ind., assignor to Marmon-Herrington Company, Inc., Indianapolis, Ind., a corporation of Indiana Application December 5, 1936, Serial No. 114,372

9 Claims. (Cl. 180—44)

The usual motor vehicle comprises a chassis frame supported at its front and rear ends upon axles which are in turn supported by wheels journalled upon the outer ends of the axles, and the vehicle is guided by swinging each of the front wheels about a substantially vertical axis.

When such a vehicle is propelled through an arc-shaped path, the front wheels always traverse longer paths than the rear wheels and each outer wheel of each pair traverses a longer path than its companion inner wheel. The last-mentioned differential is compensated, as to wheel pairs to which power is applied, by one of many well known forms of differential gearing and the first-mentioned differential, as to non-powered wheels, is of no consequence.

In vehicles where more than one pair of powered traction wheels are provided, however, as in four-wheel drive structures, the first-mentioned distance differential becomes a factor which results in undue wear of the front wheel tires and an unnecessary consumption of power which cannot be compensated by the usual differential gears interposed between the power source and the transverse pairs of traction wheels.

The object of my invention is to provide mechanism by means of which delivery of power to the front power-driven wheels will be automatically discontinued during arcuate travel and automatically resumed upon resumption of straight-line travel.

Figure 1:
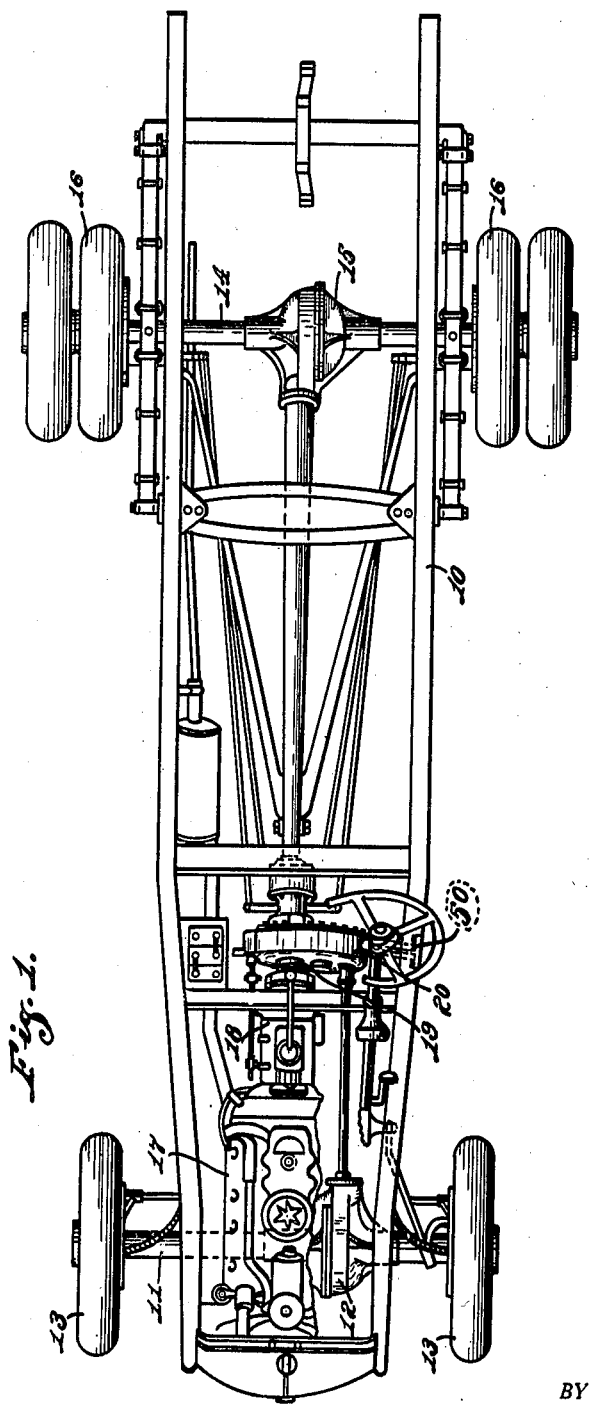
Figure 2:
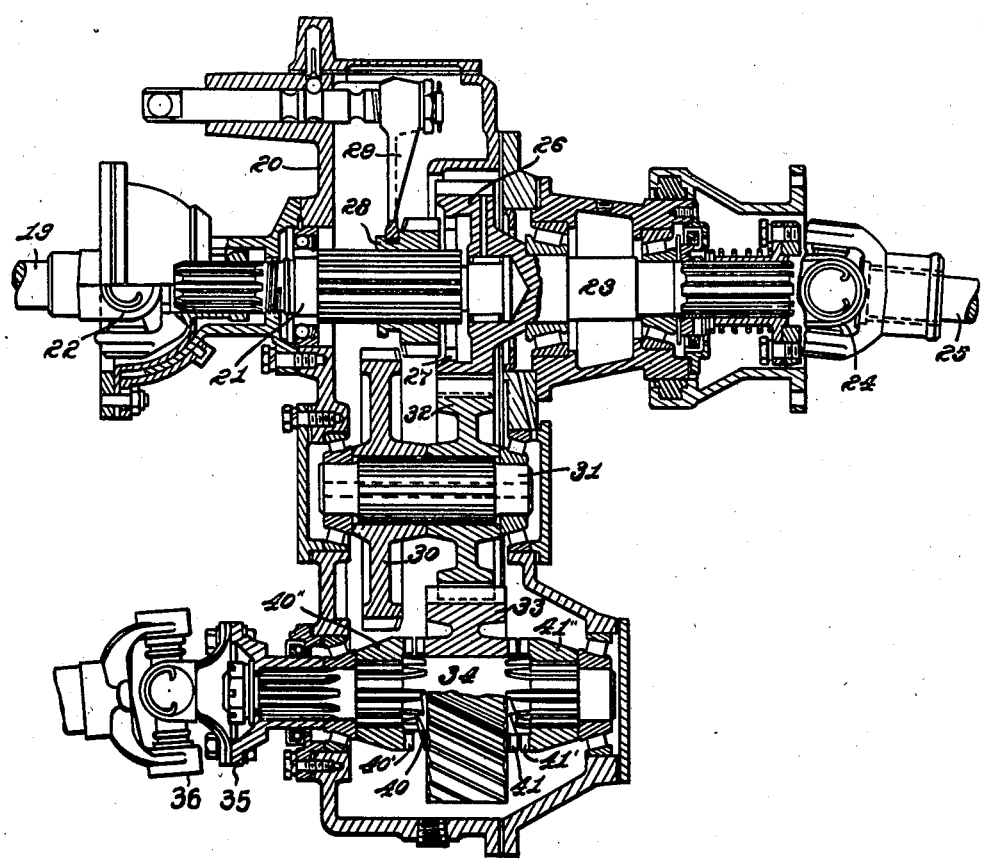

The accompanying drawings illustrate my invention:

Fig. 1 is a skeletonized diagrammatic plan of a vehicle embodying my invention; and Fig. 2 is an axial section of mechanism embodying my invention.

In the drawings 10 indicates the chassis frame, 11 the front drive axle with the usual differential 12, and front drive wheels 13, 13. An ordinary form of rear drive axle 14 with its differential 15, is provided with the rear driven track wheels 16, 16. The motor 17 delivers power to the usual speed varying gearing 18 provided with the usual controlling mechanism and having an output shaft 19.

All of the above mentioned parts are of usual well known form.

Within a casing 20 is journalled the power input shaft 21 connected by coupling 22 with shaft 19 and alined with shaft 21 is an output shaft 23 connected by coupling 24 with propeller shaft 25 which leads to the differential of the rear axle. Shaft 23 carries the gear 26 provided with a cylindrical series of clutch teeth 27 adapted to receive the teeth of a gear 28 splined upon shaft 21 and axially shiftable by means of the yoke 29 manually controlled by a suitable lever within the reach of the driver.

Gear 28, in one axial position, may mesh with the gear 30 carried by an intermediate shaft 31 journalled in casing 20. Shaft 31 also carries a gear 32 which meshes with a gear 33 which floats, circumferentially and axially on a power shaft 34 connected by coupling 35 with propeller shaft 36 which leads to the differential of the front axle.

The teeth of gears 33, 32, and 26 are of the helical type, as indicated in Fig. 2, for a reason which will appear, and the width of gear 33 is enough greater than the width of gear 32 to permit necessary axial movement of gear 33 on shaft 34 without demeshing.

The opposite ends of the hub gear 33 carry oppositely set ratchet clutch teeth 40 and 41 capable of alternate clutching engagement with clutch teeth 40' and 41', respectively, carried respectively by elements 40" and 41" connected upon shaft 34. In the intermediate position gear 33, clutch teeth 40 and 41 are out of clutching engagement with their respective companions 40' and 41' and the inclination of the teeth of gear 33 is such that application of forward driving force thereto will cause it to shift to the left (Fig. 2) to cause teeth 40 to mesh with teeth 40', and application of reverse driving force will cause the teeth 41 to mesh with the teeth 41'.

During forward arcuate travel of the vehicle, the speed of shaft 34 will increase slightly relative to the speed of shaft 31 and gear 33 will automatically shift to its middle neutral position so that the vehicle will be driven solely by the rear wheels unless, for some reason, there is slippage of the forward wheels whereupon such slippage will permit the gear 33 to be again shifted to the left, by reason of the application of forward driving force thereto, to cause resumption of engagement of teeth 40 with teeth 40'. And whenever straight line forward travel is resumed, gear 33 will be again shifted (to the left, Fig. 2) to again cause resumption of mesh of clutch teeth 40 with clutch teeth 40'. Upon the application of rearward driving force of the gear 33 through the medium of gear 32, there will be a coaction between clutch teeth 41 and 41' of the above described character, said clutch teeth remaining meshed so long as the rearward travel of the vehicle is straight line and becoming automatically demeshed during arcuate travel of the vehicle.

Casing 20 depends from the axis of the alined shafts 21 and 23, conveniently at an angle of about 45 degrees to the horizontal and is braced by a cushioning brace 50 to one side of the chassis frame.

The casing 20 is oil tight and its lower end, therefore serves as a sump for a sufficient quantity of oil entirely submerging gear 33 with its co-related clutching elements and this oil submergence serves to deaden any impact noises resulting from the automatic axial movements of gear 33.

I claim as my invention:

1. In a motor vehicle, the combination of a main frame provided with a front axle, a rear axle, a traction element supporting the front axle and swingable about a substantially vertical axis, a traction element supporting the rear axle, a power plant, a power transmission train connected with the power plant, a power transmission connection between said power transmission train and the rear traction element, and a supplemental power transmission train connecting said first-mentioned power transmission train and the front traction element, said supplemental power transmission train comprising a pair of mating clutch elements, of the ratchet type, one of which is axially-shiftable relative to the other, and means for rotating said axially-shiftable clutch element and automatically axially biasing said axially-shiftable clutch element toward its fellow clutch element.

2. In a motor vehicle, the combination of a main frame provided with a front axle, a rear axle, a traction element supporting the front axle and swingable about a substantially vertical axis, a traction element supporting the rear axle, a power plant, a power transmission train connected with the power plant, a power transmission connection between said power transmission train and the rear traction element, and a supplemental power transmission train connecting said first mentioned power transmission train and the front traction element, said supplemental power transmission train comprising two alternately and reversely mating clutches embodying an axially-shiftable element, and means for rotating said axially-shiftable clutch element and automatically axially biasing said axially-shiftable clutch element in accordance with the direction of power application thereto.

3. In a motor vehicle, the combination of a main frame provided with a front axle, a rear axle, a pair of traction elements supporting the front axle and each swingable about a substantially vertical axis, a pair of traction elements supporting the rear axle, a power plant, a power transmission train connected to the power plant, a power transmission connection including a differential between said power transmission train and the two rear traction elements, and a supplemental power transmission connection, including a differential, connecting said first-mentioned power transmission train and the two front traction elements, said supplemental power transmission connection also comprising a pair of mating clutch elements of the ratchet type, one of which is axially-shiftable relative to the other, and means for rotating said axially-shiftable clutch element and automatically axially biasing said axially-shiftable clutch element toward its fellow clutch element.

4. In a motor vehicle, the combination of a main frame provided with a front axle, a rear axle, a pair of traction elements supporting the front axle and each swingable about a substantially vertical axis, a pair of traction elements supporting the rear axle, a power plant, a power transmission train connected to the power plant, a power transmission connection including a differential between said power transmission train and the two rear traction elements, and a supplemental power transmission connection, including a differential, connecting said first-mentioned power transmission train and the two front traction elements, said supplemental power transmission train also comprising two alternately and reversely mating clutches embodying an axially-shiftable element, and means for rotating said axially-shiftable clutch element and automatically axially biasing said axially-shiftable clutch element in accordance with the direction of power application thereto.

5. A power-transmission unit for insertion between substantially alined power-delivery and power-receiving shafts, comprising a casing, a first shaft journalled in the casing and projecting through one side thereof and adapted for connection with the said power-delivery shaft, a second shaft journalled in the casing and projecting through the other side thereof and adapted for connection with said power-receiving shaft, a third shaft journalled in said casing and projecting through one side thereof and adapted for connection to a second power-receiving shaft, a selective speed power-transmission train interposed between said first shaft and the second and third shafts to equally affect said second and third shafts and an overrunning clutch interposed between said first and third shafts.

6. A power transmission unit for insertion between substantially alined power-delivery and power-receiving shafts, comprising a casing, a first shaft journalled in the casing and projecting through one side thereof and adapted for connection with the said power-delivery shaft, a second shaft journalled in the casing and projecting through the other side thereof and adapted for connection with said power-receiving shaft, a third shaft journalled in said casing and projecting through one side thereof and adapted for connection to a second power-receiving shaft, a selective speed power-transmission train interposed between said first shaft and the second and third shafts to equally affect said second and third shafts, and overrunning clutching means in the train between said first and third shafts comprising mating ratchet-tooth clutching elements and mating helical power-transmitting elements, whereby overrunning movement of the third shaft relative to the first shaft automatically separates mating of the ratchet-tooth elements and overrunning movement of the first shaft relative to the third shaft automatically mates said ratchet-tooth elements.

7. A power-transmission unit for insertion between substantially alined power-delivery and power-receiving shafts, comprising a casing, a first shaft journalled in the casing and projecting through one side thereof and adapted for connection with the said power-delivery shaft, a second shaft journalled in the casing and projecting through the other side thereof and adapted for connection with said power-receiving shaft, a third shaft journalled in said casing and projecting through one side thereof and adapted for connection to a second power-receiving shaft, a selective speed power-transmission train interposed between said first shaft and the second and third shafts to equally affect said second and third shafts, and overrunning clutching means in the train between said first and third shafts comprising two oppositely set ratched-toothed clutching elements, an intermediate axially-shiftable clutching element having oppositely set ratchet-teeth selectively matable with said first-mentioned clutching elements, and mating helical elements interposed between said intermediate clutching element and the power source whereby differential speeds between said helical elements will produce axial shifting of said intermediate clutching element.

8. A power-transmission unit comprising a casing, a shaft journalled in said casing and projected from one side thereof and adapted for connection to the power-delivery shaft of a power plant, a second shaft, laterally offset from the first shaft, journalled in said casing and projected from one side thereof and adapted for connection to a power-transmitting shaft, a power transmission train connecting said two shafts, said power-transmitting train comprising a pair of oppositely set ratchet-toothed clutching elements, an intermediate clutching element having oppositely set ratchet-toothed clutching elements selectively matable with said first-mentioned clutching elements, and a pair of mating helical elements one of which is carried by said intermediate clutching element, said intermediate clutching element being unbiased axially.

9. A power-transmission unit comprising a casing, a shaft journalled in said casing and projected from one side thereof and adapted for connection to the power-delivery shaft of a power plant, a second shaft, laterally offset from the first shaft, journalled in said casing and projected from one side thereof and adapted for connection to a power-transmitting shaft, a power-transmission selective speed train connecting said two shafts, said power-transmitting train comprising a pair of oppositely set ratchet toothed clutching elements, an intermediate clutching element having oppositely set ratchet-toothed clutching elements selectively matable with said first-mentioned clutching elements, and a pair of helical mating elements one of which is carried by said intermediate clutching element, said intermediate clutching element being unbiased axially.

ARTHUR W. HERRINGTON.